(12) United States Patent
Kanbe et al.

(10) Patent No.: US 9,272,922 B2
(45) Date of Patent: *Mar. 1, 2016

(54) INORGANIC IODIDE, PRODUCTION METHOD THEREOF, AND PRODUCTION SYSTEM THEREOF

(75) Inventors: Satoshi Kanbe, Chiba (JP); Kazumi Hosono, Tokyo (JP); Masahiro Wada, Hyogo (JP)

(73) Assignee: Nippoh Chemicals Co., Ltd., Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/864,746

(22) PCT Filed: Jan. 29, 2009

(86) PCT No.: PCT/JP2009/051422
§ 371 (c)(1), (2), (4) Date: Jul. 27, 2010

(87) PCT Pub. No.: WO2009/096447
PCT Pub. Date: Aug. 6, 2009

(65) Prior Publication Data
US 2010/0303708 A1    Dec. 2, 2010

(30) Foreign Application Priority Data
Jan. 31, 2008   (JP) .................. 2008-021326

(51) Int. Cl.
*C01B 9/06* (2006.01)
*C01D 3/12* (2006.01)
(Continued)

(52) U.S. Cl.
CPC ... *C01D 3/12* (2013.01); *C01B 9/06* (2013.01); *C01C 1/168* (2013.01); *C01F 11/20* (2013.01); *B01J 23/42* (2013.01); *C01P 2006/80* (2013.01)

(58) Field of Classification Search
CPC ............ C01B 9/06; C01D 3/12; C01C 11/20; C01C 1/168; B01J 23/42
USPC ....................... 423/491–499.5, 481
See application file for complete search history.

(56) References Cited

U.S. PATENT DOCUMENTS 2,828,184 A    3/1958  Behrman
3,278,264 A   10/1966  Robinson et al.
(Continued)

FOREIGN PATENT DOCUMENTS

EP    0 714 849    6/1996
JP    31-8013 B    9/1956
(Continued)

OTHER PUBLICATIONS

Aldrich, "Catalog Handbook of Fine Chemicals", 1996-1997, pp. 914,1254,1334.*
(Continued)

*Primary Examiner* — Ngoc-Yen Nguyen
(74) *Attorney, Agent, or Firm* — Casimir Jones, SC (57) ABSTRACT

According to a method for producing an inorganic iodide in accordance with the present invention, it is possible to efficiently produce a highly pure inorganic iodide by reacting a hydrogen iodide gas with an inorganic base compound by bringing the hydrogen iodide gas into contact with the inorganic base compound. As such, it is possible to provide a simple and efficient method for producing an inorganic iodide.

6 Claims, 1 Drawing Sheet

(51) Int. Cl.
*C01C 1/16* (2006.01)
*C01F 11/20* (2006.01)
*B01J 23/42* (2006.01)

(56) References Cited

U.S. PATENT DOCUMENTS

| | | | |
|---|---|---|---|
| 3,402,995 A | | 9/1968 | Bach |
| 3,650,693 A | * | 3/1972 | Borchardt ............... 423/611 |
| 3,879,446 A | * | 4/1975 | Blood et al. ............. 560/214 |
| 4,053,376 A | | 10/1977 | Carlin |
| 4,066,739 A | * | 1/1978 | Chen ........................ 423/571 |
| 4,111,991 A | * | 9/1978 | Garrison ................... 423/472 |
| 4,150,094 A | | 4/1979 | Mysels et al. |
| 4,272,435 A | * | 6/1981 | Matsuda et al. ........... 534/587 |
| 4,302,432 A | * | 11/1981 | Polichnowski ............ 423/487 |
| 4,357,309 A | | 11/1982 | Arnold et al. |
| 4,410,505 A | * | 10/1983 | O'Keefe et al. .......... 423/658.2 |
| 4,853,148 A | | 8/1989 | Tom et al. |
| 4,925,646 A | | 5/1990 | Tom et al. |
| 5,423,960 A | * | 6/1995 | Vaughan ................... 205/498 |
| 5,456,960 A | * | 10/1995 | Ido et al. .................. 428/36.1 |
| 5,520,793 A | | 5/1996 | Genders et al. |
| 5,693,306 A | | 12/1997 | Utsunomiya et al. |
| 6,372,017 B1 | * | 4/2002 | Maddan ........................ 75/596 |
| 6,444,142 B1 | | 9/2002 | Matsumoto |
| 6,719,817 B1 | * | 4/2004 | Marin .............................. 48/61 |
| 7,736,617 B2 | * | 6/2010 | Shoji et al. ................ 423/504 |
| 8,268,284 B2 | | 9/2012 | Kanbe |
| 2010/0303708 A1 | | 12/2010 | Kanbe et al. |

FOREIGN PATENT DOCUMENTS

| | | |
|---|---|---|
| JP | 61-048403 | 3/1986 |
| JP | 01-261224 | 10/1989 |
| JP | 8-059205 | 3/1996 |
| JP | 9-054197 | 2/1997 |
| JP | 9-59003 | 3/1997 |
| JP | 9-086902 | 3/1997 |
| JP | 10-87301 | 4/1998 |
| JP | 2004-315332 | 11/2004 |
| JP | 2005-255514 | 9/2005 |
| JP | 2005-289936 | 10/2005 |

OTHER PUBLICATIONS

"Percent Yield", taken from http://web.archive.org/web/20040625160743/http://go.hrw.com/resources/go_sc/mc/HUGPS106.PDF, Jun. 2004, pp. 1-11.*

International Search Report dated Mar. 31, 2009, International Patent Application No. PCT/JP2009/051422.

Kagakudaijiten Hensyuiinkai (ed.), "Kagakudaijiten", reduced-size 28th edition, Kyoritsu Shuppan Co., Ltd., Mar. 15, 1984, vol. 9, pp. 410-411.

The Chemical Society of Japan (ed.), "Shinjikkenkagakukouza", Maruzen Co., Ltd., Mar. 20, 1977, vol. 8, pp. 522-523.

Jacqueline I. Kroschwitz, "Encyclopedia of Chemical Technology," Fourth Edition, John Wiley & Sons, 1996, vol. 19, pp. 1084-1085.

International Search Report dated Mar. 17, 2009, International Patent Application No. PCT/JP2009/051421.

U.S. Final Office Action mailed Apr. 26, 2012 from U.S. Appl. No. 12/864,915.

U.S. Non-Final Office Action mailed Jan. 19, 2012 from U.S. Appl. No. 12/864,915.

Notice of Allowance and Fee(s) Due mailed Jul. 5, 2012 from U.S. Appl. No. 12/864,915.

* cited by examiner

INORGANIC IODIDE, PRODUCTION METHOD THEREOF, AND PRODUCTION SYSTEM THEREOF

CROSS REFERENCE TO RELATED APPLICATIONS

The present application is a Section 371 U.S. national stage entry of pending International Patent Application No. PCT/JP2009/051422, international filing date Jan. 29, 2009, which claims priority to Japanese Patent Application No. 2008-021326, filed Jan. 31, 2008.

TECHNICAL FIELD

The present invention relates to an inorganic iodide, a production method of the inorganic iodide, and a production system of the inorganic iodide. The present invention particularly relates to (i) a simple method for synthesizing a highly pure inorganic iodide and (ii) a simple system for synthesizing the highly pure inorganic iodide.

BACKGROUND ART

Conventionally, inorganic iodide has been synthesized by a variety of methods. For example, Patent Literatures 1 through 7 listed below disclose examples of methods of synthesizing inorganic iodides. Patent Literature 1 discloses a method including adding iodine to an alkaline solution so as to carry out a reaction to give iodate, and then reducing the iodate with aluminum or zinc. Patent Literature 2 discloses a method including adding iodine to an alkaline solution to obtain a solution, and then carry out reduction with hydrogen sulfide. Patent Literature 3 discloses a method including reducing iodine or iodate with alkali metal amalgam in an alkaline environment or in a neutral environment. Patent Literature 4 discloses a method including treating an iodine alkali hydroxide solution with an organic reducing agent such as formic acid, oxalic acid, or malonic acid. Patent Literature 5 discloses a method including adding iodine to a potassium hydroxide solution to obtain a solution, and then reducing the solution with formic acid serving as a reducing agent. Patent Literature 6 discloses a method including reacting iodine with potassium hydroxide or with alkaline carbonate with use of hydrazine serving as a reducing agent. Patent Literature 7 discloses a method of (i) neutralizing a potassium hydroxide solution with use of formic acid so as to obtain a resultant solution, (ii) adding an over-stoichiometric amount of iodine to the resultant solution so that the resultant solution undergoes a reaction, and (iii) treating free iodine in the post-reaction resultant solution with potassium sulfide.

CITATION LIST

Patent Literature 1
Specification of U.S. Pat. No. 2,828,184
Patent Literature 2
Specification of U.S. Pat. No. 3,402,995
Patent Literature 3
Japanese Examined Patent Application Publication, Tokukousho, No. 31-8013 B
Patent Literature 4
Japanese Patent Application Publication, Tokukaihei, No. 1-261224 A (1989)
Patent Literature 5
Specification of Russian Patent No. 560826
Patent Literature 6
Japanese Patent Application Publication, Tokukaisho, No. 61-48403 A (1986)
Patent Literature 7
Specification of Russian Patent No. 497233

SUMMARY OF INVENTION

However, according to the method of synthesizing an inorganic iodide disclosed in each of Patent Literatures 1 through 7, the inorganic iodide is synthesized by using iodine molecules as a starting material. This necessitates use of a reducing agent, and thus necessitates removal of the reducing agent or a by-product in isolating a desired inorganic iodide. In addition, some reducing agents need to be handled with extreme care because of their toxicity etc.

For example, according to the methods of Patent Literatures 1 and 7, it is necessary to remove a by-product after the reaction. According to the methods of Patent Literatures 2, 3, and 6, it is necessary to use a reducing agent that must be handled with extreme care. Meanwhile, Patent Literatures 4 and 5 employ a safe reducing agent such as formic acid or oxalic acid. However, the methods of Patent Literatures 4 and 5 involve problems that (i) a reduction reaction proceeds slowly and (ii) a resulting inorganic iodide is small in amount with respect to the amount of iodine initially contained in a reaction system. That is, according to the methods of Patent Literatures 4 and 5, a yield of the inorganic iodide is low. As described above, according to the conventional methods, it is necessary to (a) remove a reducing agent and/or by-product and/or (b) use a reducing agent that must be handled with extreme care. This contributes to an increase in the number of complicated steps to be carried out to synthesize the inorganic iodide. Under the circumstances, it has been desired to provide a simple and efficient method for producing the inorganic iodide.

The present invention has been made in view of the above problem, and an object of the present invention is to provide a simple and efficient method of producing an inorganic iodide.

In order to attain the above object, a method for producing an inorganic iodide in accordance with the present invention includes the step of: reacting a hydrogen iodide gas with an inorganic base compound by bringing the hydrogen iodide gas into contact with the inorganic base compound.

According to the above arrangement, it is possible to cause the hydrogen iodide gas and the inorganic base compound to undergo a good neutralization reaction merely by bringing the hydrogen iodide gas into contact with the inorganic base compound. Accordingly, it is possible to easily and efficiently produce the inorganic iodide.

In the present invention, the hydrogen iodide gas can be not only a 100% hydrogen iodide gas, but also a gas containing a hydrogen iodide gas. Further, in the present invention, the inorganic iodide refers to an inorganic compound which contains at least one iodine atom.

The method in accordance with the present invention is preferably arranged such that the inorganic base compound is in a form of liquid.

According to the above arrangement, it is possible to carry out gas-liquid contact between the hydrogen iodide gas and the inorganic base compound. This improves efficiency of contact and thus improves productivity.

The method in accordance with the present invention is preferably arranged such that the hydrogen iodide gas contains iodine by not more than 2 wt % with respect to a total weight, of the hydrogen iodide gas, which is 100 wt %.

According to the above arrangement, it is possible to use a highly pure hydrogen iodide gas. Accordingly, there is no need to purify the generated inorganic iodide so as to obtain the highly pure inorganic iodide. In the present invention, the "highly pure hydrogen iodide gas" refers to a hydrogen iodide gas in which a content of a compound is low that can make effect on a reaction between the hydrogen iodide gas and the inorganic base compound.

Further, in the method in accordance with the present invention, an amount of the impurity contained in the hydrogen iodide gas is preferably not more than 2 wt % with respect to the total weight (100 wt %) of the hydrogen iodide gas. In the Specification, the "impurity" refers to a substance that can make effect on a reaction between the hydrogen iodide gas and the inorganic base compound. Examples of the impurity encompass (i) iodine (iodine molecules) contained in the hydrogen iodide gas and (ii) a by-product produced in the reaction in which the hydrogen iodide gas was obtained.

The method in accordance with the present invention is preferably arranged such that the hydrogen iodide gas is obtained by bringing a purification solution into contact with a crude hydrogen iodide gas, the purification solution dissolving a substance, other than hydrogen iodide, contained in the crude hydrogen iodide gas but not dissolving hydrogen iodide.

According to the above arrangement, it is possible to feed a more pure hydrogen iodide gas to a reaction system. In the present invention, the "crude hydrogen iodide gas" refers to a hydrogen iodide gas which has not undergone a treatment for improving a purity of the hydrogen iodide gas since the generation of hydrogen iodide.

The method in accordance with the present invention is preferably arranged such that the hydrogen iodide gas comprises a hydrogen iodide gas which is generated by bringing a hydrogen gas into contact with a gaseous iodine under a presence of a catalyst.

According to the above arrangement, it is possible to feed a highly pure hydrogen iodide gas to the reaction system.

The method in accordance with the present invention is preferably arranged such that the catalyst is such that at least one type of platinum group elements is dispersed and supported on at least one of oxide and activated charcoal.

The method in accordance with the present invention is preferably arranged such that the inorganic base compound contains at least one of alkali metals and alkali earth metals.

According to the above arrangement, it is possible to produce, by a simple method, a highly pure alkali metal iodide compound and a highly pure alkali earth metal iodide compound.

The method in accordance with the present invention is preferably arranged such that the inorganic base compound is ammonia.

According to the above arrangement, it is possible to produce a highly pure ammonium iodide through a simple process.

The method in accordance with the present invention is preferably arranged such that in the step of reacting, a pH value of a reaction system at a completion of the reaction is not less than 1.50 but not more than 11.00.

According to the above arrangement, it is possible to obtain a highly pure inorganic iodide.

An inorganic iodide in accordance with the present invention is produced by any of the methods described above. According to this arrangement, it is possible to provide a highly pure inorganic iodide at low cost.

In order to attain the above object, a system for producing an inorganic iodide in accordance with the present invention includes: a generation section for generating a hydrogen iodide gas by bringing a hydrogen gas into contact with a gaseous iodine; and a reaction section for generating an inorganic iodide by bringing the hydrogen iodide gas into contact with an inorganic base compound, the hydrogen iodide gas being generated in the generation section.

According to the above arrangement, it is possible to obtain an effect similar to that of the method for producing an inorganic iodide in accordance with the present invention. Further, it is possible to feed a highly pure hydrogen iodide gas to the reaction system.

It is preferable that the system in accordance with the present invention further include: a purification section for purifying the hydrogen iodide gas by bringing a purification solution into contact with the hydrogen iodide gas, the hydrogen iodide gas being generated in the generation section, the reaction section generating the inorganic iodide from the hydrogen iodide gas which is purified in the purification section.

According to the above arrangement, it is possible to feed a more pure hydrogen iodide gas to the reaction system.

For a fuller understanding of the nature and advantages of the invention, reference should be made to the ensuing detailed description taken in conjunction with the accompanying drawing.

BRIEF DESCRIPTION OF DRAWING

FIG. 1

REFERENCE SIGNS LIST

10 Generation Section
12 Reaction Tower
14 Hydrogen Gas and Gaseous Iodine
16 Crude Hydrogen Iodide Gas
20 Purification Section
22 Filler-filled Tower
24 Tank
26 Hydrogen Iodide Gas
28 Purification Solution
30 Reaction Section
32 Reaction Tower
34 Collection Tank
36 Inorganic Iodide

DESCRIPTION OF EMBODIMENTS

Embodiment 1

A method of producing an inorganic iodide in accordance with an embodiment of the present invention includes a step of bringing a hydrogen iodide gas into contact with an inorganic base compound. In this Specification, the inorganic iodide refers to an inorganic compound having at least one (1) iodine atom. Further, a "hydrogen iodide" refers to a hydrogen iodide in a form of gas, i.e., a hydrogen iodide gas, unless otherwise stated. Furthermore, an "iodine" refers to an iodine molecule ($I_2$), unless otherwise stated.

[Hydrogen Iodide Gas]

A hydrogen iodide gas used in a method in accordance with the present embodiment refers to a gas containing hydrogen iodide gas. That is, the hydrogen iodide gas used in the present embodiment (hereinafter referred to merely as the hydrogen iodide gas) is not limited to 100% hydrogen iodide gas. The hydrogen iodide gas contains iodine by preferably not more than 2 wt % with respect to a total weight of the hydrogen iodide gas. The hydrogen iodide gas containing iodine by this amount is advantageous, because it is possible to produce a highly pure inorganic iodide without post-process treatment after synthesis of the inorganic iodide in order to achieve high purity of inorganic iodide, such as (i) a reduction treatment for removing unreacted iodine and (ii) a purification treatment.

The hydrogen iodide gas contains iodine more preferably by not more than 1 wt %, further preferably by not more than 0.5 wt %, with respect to the total weight (100 wt %) of the hydrogen iodide gas.

Further, in the present embodiment, an amount of an impurity contained in the hydrogen iodide gas is preferably not more than 2 wt % with respect to the total weight (100 wt %) of the hydrogen iodide gas. In this Specification, the "impurity" refers to a substance that can make effect on a reaction between the hydrogen iodide gas and the inorganic base compound. Examples of the impurity encompass (i) iodine (iodine molecule) contained in the hydrogen iodide gas and (ii) a by-product produced in a reaction in which the hydrogen iodide gas was obtained. That is, in the present embodiment, the highly pure hydrogen iodide gas can be a hydrogen iodide gas containing the impurity by not more than 2 wt % with respect to the total weight (100 wt %) of the hydrogen iodide gas.

In the Specification, the "impurity" refers to a substance that can make effect on the reaction between the hydrogen iodide gas and the inorganic base compound. Examples of the impurity encompass (i) iodine (iodine molecule) contained in the hydrogen iodide gas and (ii) the by-product produced in the reaction in which the hydrogen iodide gas was obtained.

The hydrogen iodide gas used in the present embodiment can be obtained by any of the commonly-known methods. The hydrogen iodide gas can be used as a raw material in the method of the present embodiment without a purification treatment, if it is sufficiently pure. Alternatively, the raw material in the method of the present embodiment can be a hydrogen iodide gas obtained by purifying a crude hydrogen iodide gas, if needed.

The following description deals with an exemplary method of generating the hydrogen iodide gas and an exemplary method of purifying the hydrogen iodide gas.

(Generation Method 1)

In Generation Method 1, it is discussed a method of generating the hydrogen iodide gas through a gas-phase catalytic reduction reaction between iodine and hydrogen. According to this method, an iodine in a form of gas is brought into contact with a hydrogen gas under the presence of a catalyst.

The catalyst used here is preferably a platinum group element dispersed and supported on at least one of oxide and activated charcoal. Such a catalyst activates iodine and hydrogen, and thus makes it possible to quickly generate the hydrogen iodide even at relatively-low temperatures. It is also possible to improve a rate of conversion of iodine and a yield of the resulting hydrogen iodide.

Examples of the platinum group element encompass platinum (Pt), palladium (Pd), ruthenium (Ru), osmium (Os), iridium (Ir), and rhodium (Rh). Specific examples of oxide encompass magnesium oxide, titanic oxide, silica, alumina, cordierite, zirconia, silica-alumina, and zeolite. Specific examples of activated charcoal encompass (i) plant-derived activated charcoal obtained by activating wood chips, wood powder, palm shells, walnut shells, or the like, (ii) mineral-derived activated charcoal obtained by activating peat, coal coke, tar, or the like, and (iii) activated charcoal obtained by activating recycled fibers; natural materials such as rayon; or synthetic materials such as phenol resin and acrylic resin.

The platinum group element, serving as the catalyst, can be used solely, or two or more kinds thereof can be used in combination. One kind of each of oxide and activated charcoal, serving as a support for the platinum group element, can be used solely, or two or more kinds thereof can be used in combination. Further, either one of oxide and activated charcoal can be used solely, or both of them can be used in combination.

The gas-phase catalytic reduction reaction is carried out at a reaction temperature falling within a range of preferably 150° C. to 1000° C., more preferably 200° C. to 900° C., and further preferably 250° C. to 850° C. Further, the gas-phase catalytic reduction reaction is carried out at a gas hourly space velocity falling within a range of preferably 300 to 10000 $hr^{-1}$, more preferably 500 to 4000 $hr^{-1}$. In this Specification, the "gas hourly space velocity" represents a ratio of a volume of the reactant gas to a volume of the catalyst per unit time under standard conditions.

According to Generation Method 1, it is possible to easily obtain a highly pure hydrogen iodide gas. The obtained hydrogen iodide gas contains neither unreacted iodine nor a gas, except for hydrogen. The hydrogen contained in the obtained hydrogen iodide gas does not make effect for example on the synthesis step of the inorganic iodide, and thus it is not necessary to additionally carrying out a treatment for isolating the hydrogen. Note however that even if the hydrogen needs to be removed from the hydrogen iodide gas, the hydrogen is easy to remove in such a manner that iodine is removed from the hydrogen iodide gas and thereafter the hydrogen iodide gas is cooled to a liquid.

(Generation Method 2)

Generation Method 2 is for example a method of generating the hydrogen iodide gas from red phosphorus, water, and iodine. This method is a commonly-known method of producing the hydrogen iodide gas. The hydrogen iodide gas obtained by this method contains unreacted iodine, and may further contain phosphoric acid in a form of gas, sulfuric acid in the form of gas, or the like.

Therefore, in a case where the hydrogen iodide gas obtained through Generation Method 2 is purified by a later-described purification method, it is preferable to use, as a purification solution, a solvent that is capable of dissolving not only (i) iodine but also (ii) phosphoric acid or sulfuric acid. One example of such a solvent is water.

(Purification Method)

The following description discusses a method of purifying, if needed, the hydrogen iodide gas obtained through Generation Method 1 or Generation Method 2. This purification treatment is for removing a substance (hereinafter may be referred to as "impurity"), other than hydrogen iodide, contained in the hydrogen iodide gas. Specifically, the purification treatment is carried out by bringing (i) a crude hydrogen iodide gas into gas-liquid contact with (ii) a purification solution that dissolves the impurity contained in the crude hydrogen iodide gas but does not dissolve hydrogen iodide. Note here that the "impurity" has the same meaning as that described earlier.

The purification solution is not limited to a particular kind, provided that it (i) dissolves the impurity contained in the hydrogen iodide gas but (ii) does not dissolve hydrogen iodide. Preferred among those is a purification solution that is capable of removing unreacted iodine. The reason thereof is as follows. The unreacted iodine is difficult to separate from hydrogen iodide, and may cause an adversely effect when the obtained hydrogen iodide is used in another reaction. Therefore, it is highly preferable that the unreacted iodide be removed here.

One example of such a purification solution is a saturated hydrogen iodide solution. The saturated hydrogen iodide solution dissolves iodine very well, but hardly dissolves hydrogen iodide because the saturated hydrogen iodide solution is already saturated with hydrogen iodide.

A solvent of the saturated hydrogen iodide solution is not limited to a particular kind, provided that the solvent dissolves hydrogen iodide. Examples of the solvent encompass water, ketones, halogen aromatic compounds, ethers, and alcohols. Alternatively, the solvent can be an aqueous solution containing iodide of alkali metal or an aqueous solution containing iodide of alkali earth metal. Specific examples of the solvent encompass water, acetone, chloroform, carbon tetrachloride, benzene, toluene, xylene, petroleum ether, dioxane, ethyl ether, methanol, a potassium iodide aqueous solution, and a barium iodide aqueous solution. Particularly preferred among those are water, the aqueous solution containing iodide of alkali metal, the ketones, and the aromatic compounds. Further more preferred among those is water, because it is readily available at low cost.

Note that accurate temperature control is not necessary for the saturated hydrogen iodide solution. The reason thereof is as follows. Although hydrogen iodide generates heat of dissolution when being dissolved in a solvent (e.g., water), it is quickly dissolved into the solvent and has high solubility in the solvent.

The gas-liquid contact can be carried out by any method, provided that the hydrogen iodide gas makes contact with the purification solution. Therefore, the gas-liquid contact may be carried out by a commonly-known method. For example, the gas-liquid contact may be carried out by a method employing a filler-filled tower (or a filler-filled tube) filled with fillers as an absorption tower (or an absorption tube). According to this method, the saturated hydrogen iodide solution and the hydrogen iodide gas make contact with each other through countercurrent flow gas-liquid contact. The countercurrent flow gas-liquid contact is such that the saturated hydrogen iodide solution which is supplied from a top of the filler-filled tower and flowed down makes contact with the hydrogen iodide gas which is introduced from a downstream end of the filler-filled tower. Alternatively, it is possible to employ cocurrent flow gas-liquid contact, by which the hydrogen iodide gas is introduced from an upstream end of the filler-filled tower.

According to the method above, the impurity which may be contained in the hydrogen iodide gas (e.g., unreacted iodine) is absorbed into the purification solution when making contact with the purification solution in the filler-filled tower. Accordingly, it is possible to very easily obtain a highly pure hydrogen iodide from a bottom of the filler-filled tower, without complicated processes. The purification solution having absorbed the impurity such as the iodine can be returned to the top of the filler-filled tower by using a circulating pump.

The fillers can be made of any material provided that (i) the fillers are not eroded or are hardly eroded by any of iodine, hydrogen iodide, and hydriodic acid, and then (ii) they increase an area where the saturated hydrogen iodide solution makes contact with the hydrogen iodide gas. Specific examples of the material of the fillers are any kind of ceramic and glass. Further, shapes of the fillers are not limited to a particular kind. For example, each of the fillers can be in a spherical shape, a cylindrical shape, or a ring shape. The fillers having an identical shape can be used solely, and those having different shapes can be used in combination. As well as the fillers, the filler-filled tower is preferably made of a material that is not eroded or is hardly eroded by any of iodine, hydrogen iodide, and hydriodic acid.

A size of the filler-filled tower can be determined as needed depending on an amount of the hydrogen iodide gas which is to be purified. Likewise, (i) an amount of the saturated hydrogen iodide solution to be used and (ii) a flow rate at which the saturated hydrogen iodide solution flows can be determined as needed depending on the size of the filler-filled tower to be used (i.e., depending on the amount of the hydrogen iodide gas which is to be purified).

The purification can be carried out by using a device employing a batch purification tank, instead of using the filler-filled tower above. This device is specifically a device of blowing the hydrogen iodide gas, which includes the impurity, into a purification tank containing the purification solution. The device also makes it possible to extremely-easily obtain the highly pure hydrogen iodide without complicated processes, because the impurity included in the hydrogen iodide gas is dissolved and absorbed into the purification solution in the purification tank.

It should be noted that the solubility of the impurity in the purification solution is limited. Therefore, for example if the purification solution is oversaturated with the impurity and then the impurity starts separating out, then the purification solution is preferably replaced with a new purification solution. This applies to both cases of using the filler-filled tower and using the device employing the batch purification tank. Note here that iodine dissolved in the purification solution is preferably concentrated and then collected as a solid iodine. The collected iodine can be re-used for the reaction in which a hydrogen iodide is generated.

The purification method as above makes it possible to very easily remove the impurity from the hydrogen iodide gas, substantially without loss of the generated hydrogen iodide. That is, it is possible to efficiently and very easily obtain the highly pure hydrogen iodide gas.

[Inorganic Base Compound]

An inorganic base compound used in the present embodiment can be neutralized with hydrogen iodide. One example of the inorganic base compound is a compound which dissociates or equilibrates in water to give a hydroxide ion (OH). Preferred examples of the inorganic base compound are (i) metal hydroxide, e.g., alkali metal, alkali earth metal, a rare earth element, transition metal, and hydroxides of typical elements such as aluminum and zinc, (ii) basic oxides of metal, (iii) carbonates of metal such as a carbonate of alkali metal, (iv) hydrogen carbonates of metal such as a hydrogen carbonate of alkali metal, and (v) ammonia.

Especially preferred among those are the hydroxide of alkali metal, the hydroxide of alkali earth metal, and ammonia, because these are readily available at low cost. It is preferable to use at least one of these inorganic base compounds.

The inorganic base compound is used in the reaction (i) in a form of solid, (ii) in a form of aqueous solution obtained by dissolving the inorganic base compound completely in a solvent such as water, or (iii) in a form of slurry obtained by dispersing the inorganic base compound in water. It is particularly preferable that the inorganic base compound be used in the reaction in the form of aqueous solution obtained by dissolving the inorganic base compound in water. This is described in detail in the following Reaction.

[Reaction]

According to a production method in accordance with the present embodiment, the hydrogen iodide gas is brought into contact with the inorganic base compound. That is, the method in accordance with the present embodiment is a method by which a targeted inorganic iodide is obtained by making the hydrogen iodide gas and the inorganic base compound in contact with each other so that they undergo a neutralization reaction. The neutralization reaction is represented by the following chemical equation (1), in a case where the inorganic base compound is potassium hydroxide:

$$HI+KOH \rightarrow KI+H_2O \tag{1}$$

The reaction of the hydrogen iodide gas and the inorganic base compound is preferably carried out by gas-liquid contact, which employs the inorganic base compound in a form of liquid (hereinafter may be referred to as "inorganic base solution"). The gas-liquid contact is more preferable than gas-solid contact because the gas-liquid contact improves efficiency of contact and thus improves productivity.

In a case of the gas-liquid contact, a concentration of the inorganic base solution is not limited provided that the inorganic base solution has the inorganic base compound dissolved therein. It is preferable that the inorganic base solution be saturated, because a necessary amount of a solvent is extremely small. In a case of using the saturated inorganic base solution, it is possible to save cost of raw materials. Further, it is possible to reduce an energy amount required for separating and collecting the inorganic iodide from a reactant solution, thereby saving production cost. Note that a solvent used here can be at least one of water and an alcohol.

The gas-liquid contact can be carried out by any of commonly-known methods. For example, the gas-liquid contact can be carried out by bringing the hydrogen iodide gas into contact with the inorganic base solution in a reaction tower filled with fillers. Alternatively, the gas-liquid contact can be carried out by blowing the hydrogen iodide gas into a tank containing the inorganic base solution.

Meanwhile, in the case of the gas-solid contact, the hydrogen iodide gas is introduced into a glass tube, which is filled with granular potassium hydroxide, so that they undergo a reaction.

In the reaction of the present embodiment, a reaction temperature is not particularly limited as long as the reaction proceeds. On the other hand, a pH value is preferably controlled so that the pH value of a reaction system at the completion of the reaction is not less than 1.50 but not more than 11.00. That is, in the case of the gas-liquid contact, a final pH value of the reactant solution is preferably within the above range. If the final pH value of the reactant solution is less than 1.50, then iodine or hydrogen iodide is likely to remain in a finished product. That is, it is impossible to obtain a high-quality potassium iodide. On the other hand, if the final pH value of the reactant solution is more than 11.00, then iodate is likely to remain in the finished product. That is, it is impossible to obtain a high-quality inorganic iodide. The pH value of the reactant solution at the completion of the reaction is more preferably not less than 2.0 but not more than 10.00, and further preferably not less than 2.00 but not more than 7.00.

The pH value of the reaction system can be controlled by adding an acidic compound or an alkaline compound depending on the measured pH value. For example, the inorganic base solution is added in a case where the measured pH value is less than 1.50, whereas hydrogen iodide or organic acid is added in a case where the measured pH value is more than 11.00.

Organic acid to be used is preferably reducible acid. Examples of such organic acid encompass acid, hydrazine, sulfurous acid, and phosphorous acid. The pH control by use of such reducible acid stabilizes potassium iodide. Further, the reducible acid not only controls the pH value, but also removes unreacted iodine and prevents iodine from being liberated as a result of decomposition of the inorganic iodide.

Furthermore, it is possible to carry out, if needed, a reduction treatment after the completion of the reaction so as to remove the unreacted iodine. The reduction treatment can be a commonly-known reduction treatment, by which to add a reducing agent such as formic acid and/or oxalic acid. The reduction treatment should be carried out particularly in a case where a hydrogen iodide gas, which contains iodine by 4 or more wt % with respect to the total weight of the gasses used in the reaction system, is used in the reaction without the purification.

According to the production method of the present embodiment, the hydrogen iodide gas and the inorganic base compound are brought into contact with each other. Accordingly, it is possible to easily and efficiently obtain a highly pure inorganic iodide. In addition, if the hydrogen iodide gas used in this method has a high purity, then it is possible to produce the highly pure inorganic iodide without an additional purification step.

Embodiment 2

The following description deals with a production system of an inorganic iodide in accordance with the present embodiment.

A system for producing an inorganic iodide in accordance with one embodiment of the present invention includes:

a generation section for generating a hydrogen iodide gas by bringing a hydrogen gas into contact with a gaseous iodine; and a reaction section for bringing the hydrogen iodide gas into contact with an inorganic base compound.

The system in accordance with the present embodiment preferably further includes a purification section for purifying the hydrogen iodide gas generated in the generation section.

Figure 1:
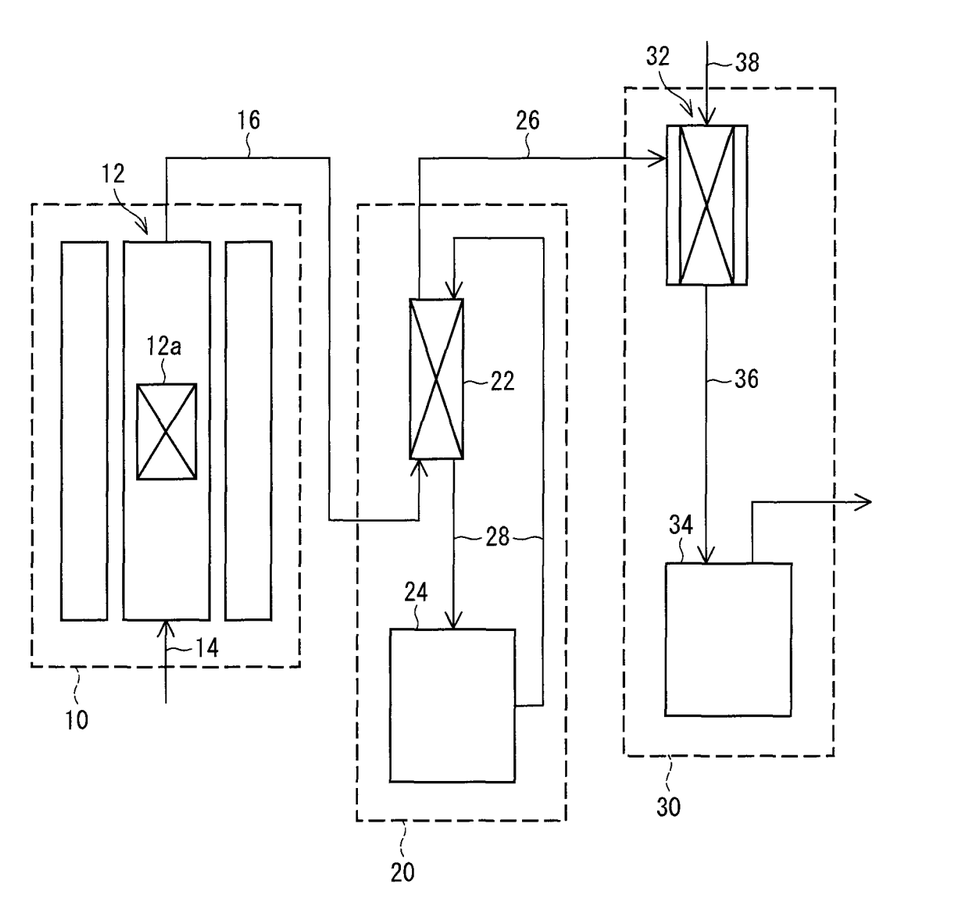
FIG. 1 is a block diagram illustrating a production system according to an embodiment of the present invention.

The system in accordance with the present embodiment is described with reference to FIG. 1. FIG. 1 is a block diagram illustrating the system in accordance with the present embodiment. The system in accordance with the present embodiment includes a hydrogen iodide gas generation section 10, a purification section 20, and a reaction section 30.

(Generation Section)

The hydrogen iodide gas generation section 10 includes a reaction tower 12 in which the hydrogen gas is reacted with iodine. The reaction tower 12 includes a catalyst layer 12a. The hydrogen gas and a gaseous iodine 14 are supplied into the reaction tower 12 from a bottom of the reaction tower 12 so as to generate a crude hydrogen iodide gas 16. Then, the crude hydrogen iodide gas 16 thus generated comes out of the reaction tower 12 from a top of the reaction tower 12. The catalyst laser 12a is filled with a catalyst which is same as that described in Embodiment 1. Further, on an outer surface of the reaction tower 12, a heating device (e.g., heating furnace or oil bath) is provided.

(Purification Section)

The purification section 20 includes (i) a filler-filled tower 22 which is filled with fillers and (ii) a tank 24 containing a purification solution. In the filler-filled tower 22, the crude hydrogen iodide gas 16 generated in the generation section 10 is brought into gas-liquid contact with the purification solution. The purification solution used here can be same as that described in Embodiment 1.

In the purification section 20, the purification solution 28 contained in the tank 24 is supplied into the filler-filled tower 22 from a top of the filler-filled tower 22 and is then drained out of the filler-filled tower 22 from a bottom of the filler-filled tower 22. The purification solution 28 thus drained out is then collected in the tank 24. That is, the purification solution 28 circulates between the tank and the filler-filled tower 22. Meanwhile, the crude hydrogen iodide gas 16 generated in the generation section 10 is supplied to the filler-filled tower 22 from the bottom (downstream end) of the filler-filled tower 22. The crude hydrogen iodide gas then makes gas-liquid contact with the purification solution 28 in the filler-filled tower 22, and then comes out of the filler-filled tower 22 from the top of the filler-filled tower 22. In this way, the hydrogen iodide gas is brought into contact with the purification solution. As such, it is possible to remove unreacted iodine contained in the hydrogen iodide gas, thereby obtaining a highly pure hydrogen iodide gas 26.

Alternatively, the purification section 20 can be configured such that (i) the hydrogen iodide gas is directly blown into a tank containing a purification solution so that an impurity included in the hydrogen iodide gas is removed in the tank, and then (ii) the hydrogen iodide gas, from which the impurity has been removed, is collected.

(Reaction Section)

The reaction section 30 includes (i) a reaction tower 32 in which the hydrogen iodide gas is brought into contact with the inorganic base compound and (ii) a collection tank 34 which collects a product obtained in the reaction. The reaction tower 32 receives an inorganic base solution 38 supplied from an upstream end of the reaction tower 32. Meanwhile, the reaction tower 32 receives the hydrogen iodide gas 26 which crosses a flow path of the inorganic base solution 38. The inorganic base solution 38 and the hydrogen iodide gas 26 are brought into gas-liquid contact with each other in the reaction tower 32 to undergo a neutralization reaction. In this way, an inorganic iodide 36 is obtained. The obtained inorganic iodide 36 is collected, as an inorganic iodide solution, in the collection tank 34. On an outer surface of the reaction tower 32, a temperature control system for controlling a temperature of the reaction system is provided. The temperature control system is for example a cooling system.

Then, a solvent of the inorganic iodide solution collected in the collection tank 34 is distilled away. In this way, a desired inorganic iodide is obtained.

Alternatively, the reaction section 30 can be configured such that the hydrogen iodide gas 26 is directly blown into a tank containing an inorganic base solution.

According to the system in accordance with the present embodiment, it is possible to easily and efficiently produce a highly pure hydrogen iodide gas that is suitably applicable for a reaction with the inorganic base compound. In addition, it is possible to bring the resulting hydrogen iodide gas into contact with the inorganic base compound without exposure to air.

EXAMPLE

Example 1

(Generation of Crude Hydrogen Iodide Gas)

A hydrogen gas (flow rate: 450 ml/min) was brought into contact with a gaseous iodine (flow rate: 75 ml/min) under the presence of a platinum catalyst of 350° C. The platinum catalyst was such that platinum was supported on alumina particles (i.e., supports) having a particle diameter of 3 mm, in a ratio of 1 g of platinum to 1 L of the alumina particles. In this way, a hydrogen iodide gas was generated. The generated hydrogen iodide gas contained unreacted iodine and hydrogen iodide in a weight ratio of 2 to 98 (rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube in order for the unreacted iodine to be dissolved into the saturated hydrogen iodide solution. In this way, the unreacted iodine was absorbed into the saturated hydrogen iodide solution.

(Evaluation of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99. Note here that a rate of generation of the hydrogen iodide was 0.00656 mol/min.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas obtained earlier was blown into the four-neck flask, where hydrogen iodide and potassium hydroxide undergo a neutralization reaction. Note here that the hydrogen iodide gas was blown into the four-neck flask while checking a pH value of a reactant solution by using a pH meter, and the blow was stopped when the pH value of the reactant solution reached 5.72. Then, the reactant solution was transferred to a rotating evaporator, by which the reactant solution was completely concentrated and 110 g of water was collected. Thereafter, the concentrated product was well dried, so that 27.8 g of colorless potassium iodide was obtained as a solid product. A yield of the potassium iodide was 97.2% with respect to the amount of potassium hydroxide which was initially contained.

(Evaluation of Potassium Iodide)

The solid product obtained earlier was measured for its purity by titration using a potassium iodate solution. As a result, the purity was 99.8 wt %. Further, the solid product was checked visually for its color to find that it was white. This means that the solid product contained no iodine. Furthermore, 1 g of the solid product was dissolved in 40 ml of water to obtain a solution, and then 1 ml of chloroform was added to 5 ml of the solution. The solution was shaken well to find that a color of a chloroform phase was not purple. Moreover, 1 g of the solid product was dissolved in 20 ml of water containing no dissolved oxygen so as to obtain a solution, and then 1 ml of starch solution was added to the solution. Thereafter, 0.3 ml of 0.5 mol/l sulfuric acid was added to the solution at a controlled temperature of approximately 15° C., and the solution was allowed to stand for a minute. As a result, it was found that a color of the solution was not blue. This means that the solid product contained no potassium iodate. Furthermore, 5 g of the solid product was dissolved in 100 ml of water containing no carbon dioxide, so as to obtain a solution. Then, a pH value of the solution was measured by using a pH meter to find that the pH value was 6.76. Each of these results satisfied its corresponding values specified by Japanese Industrial Standards (JIS).

Example 2

(Generation of Crude Hydrogen Iodide Gas)

First, water (300 g; 16.7 mol) and red phosphorus (31 g; 1.00 mol) were introduced into a four-neck flask to obtain a mixture. The mixture was cooled to 0° C. with stirring. Next, iodine (634.5 g; 2.50 mol) was added to the mixture in ten portions, and the mixture was reacted for 4 hours. In this way, a hydrogen iodide was synthesized. Then, the four-neck flask was heated under a normal pressure with a flow of a nitrogen gas inside thereof at 30 ml/min so that excess of the hydrogen iodide turned into a hydrogen iodide gas. Note that the excess of hydrogen iodide here refers to an amount, of the hydrogen iodide, by which the hydrogen iodide contained in water excesses an azeotropic composition between the hydrogen iodide and the water (57 wt % of the hydrogen iodide with respect to the water) under a normal pressure.

The hydrogen iodide gas obtained earlier was absorbed into water, and then was measured for its iodine content and hydrogen iodide content by titration using a sodium thiosulfate solution and a sodium hydroxide solution, respectively. As a result, the hydrogen iodide gas contained iodine and hydrogen iodide in a weight ratio of 0.7 to 99.3.

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube in order for the unreacted iodine to be dissolved into the saturated hydrogen iodide solution. In this way, the unreacted iodine was absorbed into the saturated hydrogen iodide solution.

(Evaluation of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99.

(Reaction with Inorganic Base Compound)

The purified hydrogen iodide gas and a potassium hydroxide solution underwent a neutralization reaction to give potassium iodide, in the same manner as in Example 1. A yield of potassium iodide was 96.8%.

(Evaluation of Potassium Iodide)

The potassium iodide obtained earlier was measured for (i) its purity, (ii) its iodine content and potassium iodate content, and (iii) a pH value of an aqueous solution thereof, in the same manner as in Example 1. As a result, the purity was 99.6 wt %. Meanwhile, neither iodine nor potassium iodate was detected. The pH value of the aqueous solution of the potassium iodide was 6.80. Each of these results satisfied its corresponding values specified by JIS.

Example 3

(Generation of Crude Hydrogen Iodide Gas)

A hydrogen gas (flow rate: 450 ml/min) was brought into contact with a gaseous iodine (flow rate: 75 ml/min) under the presence of a platinum group catalyst of 350° C. In this way, a hydrogen iodide gas was generated. The generated hydrogen iodide gas contained unreacted iodine and hydrogen iodide in a weight ratio of 2 to 98 (Rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top portion of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube in order for the unreacted iodine to be dissolved into the saturated hydrogen iodide solution. In this way, the unreacted iodine was absorbed into the saturated hydrogen iodide solution.

(Measurement of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99. Note here that a rate of generation of the hydrogen iodide was 0.00656 mol/min.

(Reaction with Inorganic Base Compound)

First, (i) 200 ml of ion-exchange water and (ii) 54.0 g of barium hydroxide octahydrate were introduced into a 300 ml four-neck flask so as to obtain a mixture solution. Next, the hydrogen iodide gas obtained earlier was blown into the mixture solution at a controlled temperature of not more than 60° C. so that the mixture solution and the hydrogen iodide gas underwent a neutralization reaction. Note here that the hydrogen iodide gas was blown into the mixture solution (reactant solution) while checking a pH value of the reactant solution by using a pH meter, and the blow was stopped when the pH value of the reactant solution reached 6.05.

Then, the reactant solution was transferred to a rotating evaporator, by which water in the reactant solution was removed under a reduced pressure so that the reactant solution was concentrated. At the completion of the concentration, it was found in the four-neck flask that crystals of barium iodide dehydrate were separated out in a form of slurry. The slurry was separated into liquid and solid products through absorption filtration by using a Buchner funnel, so as to obtain moist crystals. The moist crystals were dried under a reduced pressure at 60° C., so as to obtain 70 g of barium iodide dehydrate as a white-colored solid product. A yield of the solid barium iodide dehydrate was 95.8% with respect to the amount of barium hydroxide octahydrate which was initially contained.

(Evaluation of Barium Iodide Dehydrate)

The white-colored solid product obtained earlier was measured for its purity by silver nitrate titration. As a result, the purity was 99.6 wt %.

Example 4

(Generation of Crude Hydrogen Iodide Gas)

A hydrogen gas (flow rate: 450 ml/min) was brought into contact with a gaseous iodine (flow rate: 75 ml/min) under the presence of a platinum group catalyst of 350° C. In this way, a hydrogen iodide gas was generated. The generated hydrogen iodide gas contained unreacted iodine and hydrogen iodide in a weight ratio of 2 to 98 (rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube in order for the unreacted iodine to be dissolved into the saturated hydrogen iodide solution. In this way, the unreacted iodine was absorbed into the saturated hydrogen iodide solution.

(Evaluation of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99. Note here that a rate of generation of the hydrogen iodide was 0.00656 mol/min.

(Reaction with Inorganic Base Compound)

The hydrogen iodide gas purified earlier was blown into a 200 ml four-neck flask containing a 25 wt % ammonia water (100 g; 1.47 mol) so that the hydrogen gas and the ammonia water underwent a neutralization reaction. Note here that the hydrogen iodide gas was blown into the four-neck flask while checking a pH value of a reactant solution by using a pH meter, and the blow was stopped when the pH value of the reactant solution reached 7.90.

Then, the reactant solution was transferred to a rotating evaporator, by which water in the reactant solution was removed under a reduced pressure so that the reactant solution was concentrated. At the completion of the concentration, it was found in the flask that crystals of ammonium iodide were separated out in a form of slurry. The slurry was separated into liquid and solid products through absorption filtration by using a Buchner funnel, so as to obtain moist crystals. The moist crystals were dried at a reduced pressure at 60° C. so as to obtain 204 g of white-colored ammonium iodide. A yield of the ammonium iodide was 95.7% with respect to the amount of ammonia which was initially contained.

(Evaluation of Ammonium Iodide)

The ammonium iodide was measured for its purity by potassium iodate titration. As a result, the purity was 99.3 wt %.

Example 5

(Generation of Crude Hydrogen Iodide Gas)

A hydrogen gas (flow rate: 450 ml/min) was brought into contact with a gaseous iodine (flow rate: 75 ml/min) under the presence of a platinum group catalyst of 350° C. In this way, a hydrogen iodide gas was generated. The generated hydrogen iodide gas contained unreacted iodine and hydrogen iodide in a weight ratio of 2 to 98 (rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube in order for the unreacted iodine to be dissolved into the saturated hydrogen iodide solution. In this way, the unreacted iodine was absorbed into the saturated hydrogen iodide solution.

(Evaluation of Hydrogen Iodide Gas)

The hydrogen iodide gas which has come out of the absorption tube (that is, hydrogen iodide) was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas obtained earlier was blown into the four-neck flask, where hydrogen iodide and potassium hydroxide underwent a neutralization reaction. Note here that the hydrogen iodide gas was blown into the four-neck flask while checking a pH value of a reactant solution by using a pH meter, and the blow was stopped when the pH value of the reactant solution reached 10.84. Then, the reactant solution was transferred to a rotating evaporator, by which the reactant solution was completely concentrated and 110 g of water was collected. Thereafter, the concentrated product was well dried, so that 27.8 g of solid potassium iodide was obtained. A yield of potassium iodide was 97.5 wt % with respect to the amount of potassium hydroxide which was initially contained.

(Evaluation of Potassium Iodide)

The solid product obtained earlier was evaluated in the same manner as in Example 1. As a result, a purity of the solid potassium iodide was 99.5 wt %. Meanwhile, neither iodine nor potassium iodate was detected. A pH value of an aqueous solution of the solid potassium iodide was 9.72.

Example 6

(Generation of Crude Hydrogen Iodide Gas)

A hydrogen gas (flow rate: 450 ml/min) was brought into contact with a gaseous iodine (flow rate: 75 ml/min) under the presence of a platinum catalyst of 350° C. The platinum catalyst was such that platinum was supported on alumina particles (i.e., supports) having a particle diameter of 3 mm, in a ratio of 1 g of platinum to 1 L of the alumina particles. In this way, a hydrogen iodide gas was generated. The generated hydrogen iodide gas contained unreacted iodine and hydrogen iodide in a weight ratio of 2 to 98 (rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from the bottom of the absorption tube so that the unreacted iodine was absorbed into the saturated hydrogen iodide solution.

(Evaluation of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99. Note here that a rate of generation of the hydrogen iodide was 0.00656 mol/min.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas obtained earlier was blown into the four-neck flask, where hydrogen iodide and potassium hydroxide underwent a neutralization reaction. Note here that the hydrogen iodide gas was blown into the four-neck flask while checking a pH value of a reactant solution by using a pH meter, and the blow was stopped when the pH value of the reactant solution reached 11.62. Then, the reactant solution was transferred to a rotating evaporator, by which the reactant solution was completely concentrated. Thereafter, the concentrated product was well dried, so that 27.7 g of colorless potassium iodide was obtained. A yield of the potassium iodide was 97.0% with respect to the amount of potassium hydroxide which was initially contained.

(Evaluation of Potassium Iodide)

The potassium iodide obtained earlier was evaluated in the same manner as in Example 1. As a result, a purity of the potassium iodide was 97.4 wt %. Although iodine was not detected, potassium iodate was detected. A pH value of an aqueous solution of the potassium iodide was 10.61.

Example 7

(Generation of Crude Hydrogen Iodide Gas)

A hydrogen gas (flow rate: 450 ml/min) was brought into contact with a gaseous iodine (flow rate: 75 ml/min) under the presence of a platinum catalyst of 350° C. The platinum catalyst was such that platinum was supported on alumina particles (i.e., supports) having a particle diameter of 3 mm, in a ratio of 1 g of platinum to 1 L of the alumina particles. In this way, a hydrogen iodide gas was generated. The generated hydrogen iodide gas contained unreacted iodine and hydrogen iodide in a weight ratio of 2 to 98 (rest of the hydrogen iodide gas was hydrogen).

(Purification of Hydrogen Iodide Gas)

First, a vertical glass absorption tube (hereinafter may be referred to merely as an absorption tube) filled with 20 ml of ring-shaped magnetic fillers was prepared. Next, a saturated hydrogen iodide solution was supplied into the absorption tube from a top of the absorption tube by using a pump so that the saturated hydrogen iodide solution flowed down to a bottom of the absorption tube. Note that a flow rate of the saturated hydrogen iodide solution here was 50 ml/min. Then, the hydrogen iodide gas obtained earlier was introduced into the absorption tube from a top part thereof but slightly lower than a part through which the saturated hydrogen iodide solution was supplied. In this way, the unreacted iodine was absorbed into the saturated hydrogen iodide solution.

(Evaluation of Hydrogen Iodide Gas)

The hydrogen iodide gas which has come out of the absorption tube was absorbed into water, and collected as a hydrogen iodide solution. The obtained hydrogen iodide solution was measured for its iodine content and hydrogen iodide content by titration using a sodium thiosulfate solution and a sodium hydroxide solution, respectively. As a result, the hydrogen iodide solution contained iodine and hydrogen iodide in a weight ratio of 0.01 to 99.99. Note here that a rate of generation of the hydrogen iodide was 0.00656 mol/min.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas obtained earlier was blown into the four-neck flask, where hydrogen iodide and potassium hydroxide underwent a neutralization reaction. Note here that the hydrogen iodide gas was blown into the four-neck flask while checking a pH value of a reactant solution by using a pH meter, and the blow was stopped when the pH value of the reactant solution reached 1.05. Then, the reactant solution was transferred to a rotating evaporator, by which the reactant solution was completely concentrated. Thereafter, the concentrated product was well dried, so that 28.3 g of light yellow-colored potassium iodide was obtained. A yield of the potassium iodide was 99.1 wt % with respect to the amount of potassium hydroxide which was initially contained.

(Evaluation of Potassium Iodide)

The potassium iodide obtained earlier was evaluated in the same manner as in Example 1. As a result, a purity of the potassium iodide was 99.4 wt %. Meanwhile, iodine was detected. A pH value of an aqueous solution of the potassium iodide was 4.41. Note that it was not able to check whether or not potassium iodate was contained, because the method described in JIS is unable to measure a sample containing iodine due to its measurement principle.

Example 8

(Generation of Crude Hydrogen Iodide Gas)

A hydrogen gas (flow rate: 450 ml/min) was brought into contact with a gaseous iodine (flow rate: 75 ml/min) under the presence of a platinum catalyst of 350° C. The platinum catalyst was such that platinum was supported on alumina particles (i.e., supports) having a particle diameter of 3 mm, in a ratio of 1 g of platinum to 1 L of the alumina particles. In this way, a hydrogen iodide gas was generated. The generated hydrogen iodide gas contained unreacted iodine and hydrogen iodide in a weight ratio of 2 to 98 (rest of the hydrogen iodide gas was hydrogen). Note here that a rate of generation of the hydrogen iodide was 0.00656 mol/min.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas, containing the unreacted iodine, obtained earlier was blown into the four-neck flask, where hydrogen iodide and potassium hydroxide underwent a neutralization reaction. Note here that the hydrogen iodide gas was blown into the four-neck flask while checking a pH value of a reactant solution by using a pH meter, and the blow was stopped when the pH value of the reactant solution reached 6.95. Then, 0.56 g of 14 wt % formic acid solution was added to the reactant solution, and then 0.15 g of 48 wt % potassium hydroxide solution was added to the reactant solution. A pH value of the reactant solution here was 12.67. Thereafter, the reactant solution was put in a hot water bath, and the hot water bath was boiled for 4 hours. After 4 hours, the reactant solution was cooled down and measured for its pH value. The pH value of the reactant solution here was 3.66. Then, the reactant solution was transferred to a rotating evaporator, by which the reactant solution was completely concentrated. Thereafter, the concentrated product was well dried, so that 27.5 g of white-colored potassium iodide was obtained. A yield of the potassium iodide was 96.9 wt % with respect to the amount of potassium hydroxide which was initially contained.

(Evaluation of Potassium Iodide)

The potassium iodide obtained earlier was evaluated in the same manner as in Example 1. As a result, a purity of the potassium iodide was 99.5 wt %. Meanwhile, neither iodine nor potassium iodate was detected. A pH value of an aqueous solution of the potassium iodide was 6.69.

Reference Example 9

(Generation of Crude Hydrogen Iodide Gas)

A hydrogen gas (flow rate: 75 ml/min) was brought into contact with a gaseous iodine (flow rate: 75 ml/min) under the presence of a platinum catalyst of 350° C. The platinum catalyst was such that platinum was supported on alumina particles (i.e., supports) having a particle diameter of 3 mm, in a ratio of 1 g of platinum to 1 L of the alumina particles. In this way, a hydrogen iodide gas was generated. The generated hydrogen iodide gas contained unreacted iodine and hydrogen iodide in a weight ratio of 4.3 to 95.7 (rest of the hydrogen iodide gas was hydrogen). Further, note here that a rate of generation of the hydrogen iodide was 0.00641 mol/min.

(Reaction with Inorganic Base Compound)

First, (i) 20.1 g of 48 wt % potassium hydroxide solution prepared from 96 wt %-pure potassium hydroxide and (ii) 100 g of ion-exchange water were introduced into a 200 ml four-neck flask. Next, the hydrogen iodide gas, containing the unreacted iodine, obtained earlier was blown into the four-neck flask, where hydrogen iodide and potassium hydroxide underwent a neutralization reaction. Note here that the hydrogen iodide gas was blown into the four-neck flask while checking a pH value of a reactant solution by using a pH meter, and the blow was stopped when the pH value of the reactant solution reached 5.70. Then, the reactant solution was transferred to a rotating evaporator, by which the reactant solution was completely concentrated. Thereafter, the concentrated product was well dried, so that 28.1 g of brown-colored potassium iodide was obtained. A yield of the potassium iodide was 98.2 wt % with respect to the amount of potassium hydroxide which was initially contained.

(Evaluation of Potassium Iodide)

The potassium iodide obtained earlier was measured for it purity in the same manner as in Example 1. As a result, the purity was 97.2 wt %.

Further, a pH value of an aqueous solution of the potassium iodide was measured, and found to be 7.01. Furthermore, iodine was detected in the same manner as in Example 1. Note that it was not able to or not potassium iodate was contained, because a sample containing iodine could not be measured according to the measurement principle specified in the JIS Act.

Comparative Example 1

First, (i) 113 g of pure water, (ii) 138 g of 48 wt % potassium hydroxide solution, and (iii) 150 g of iodine were introduced into a 300 ml four-neck flask so as to obtain a mixture. The mixture was stirred. Next, 32 g of 88 wt % formic acid was dropped into the mixture over 15 minutes, while stirring the mixture at a controlled temperature falling within a range of 30° C. to 40° C. After spontaneous heating was stopped, the mixture was heated to a temperature falling within a range of 100° C. to 105° C. by using a mantle heater. Then, the mixture was aged over 2 hours, so as to obtain an aged solution. The aged solution was transferred to a rotating evaporator, by which the aged solution was concentrated. The concentrated product was well dried, so that 190.0 g of solid product was obtained. The solid product was slightly colored purple. The solid product in whole was dissolved into 100 g of pure water, so as to obtain a mixture solution. Then, 0.6 g of powdered activated carbon was added to the mixture solution. The mixture solution was then stirred for 30 minutes. Thereafter, the mixture solution was filtered under a reduced pressure so as to filter out the activated carbon. As a result, a filtrate was obtained. The filtrate was again put into the rotating evaporator, by which water contained therein was removed. As a result, 189 g of white-colored solid product was obtained. The solid product contained potassium iodide by 96.4 wt %. Further, the solid product contained potassium iodate by 3.0 wt %.

Comparative Example 2

The same processes as in Comparative Example 1 were carried out except that a time taken for the reaction was 6 hours. As a result, 191 g of white-colored solid product was obtained. The solid product contained potassium iodide by 99.5 wt %. On the other hand, potassium iodate was not detected.

Examples 1 through 8 and Reference Example 9 demonstrated that it was possible to obtain a highly pure inorganic iodide through simple processes. Further, a comparison between (i) Examples 1 and 2 and (ii) Examples 5, 6, and 7 demonstrated that it was possible to obtain, by controlling a pH value of the reaction system, a potassium iodide which satisfied values specified by JIS regarding the pH value and the iodine content and potassium iodate content. Furthermore, a comparison between (a) Reference Example 9 and (b) Examples 1 and 2 demonstrated that it was possible to obtain a potassium iodide which satisfied the values specified by JIS, by suppressing an unreacted iodine content of the hydrogen iodide gas to not more than 4 wt %.

Moreover, Examples 1 through 8 and Reference Example 9, which employed simpler processes than Comparative Examples 1 and 2, were found to be more efficient in reaction than Comparative Examples 1 and 2.

According to a method for producing an inorganic iodide in accordance with the present invention, it is possible to easily and efficiently produce a highly pure inorganic iodide by bringing a hydrogen iodide gas into contact with an inorganic base compound.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

According to the present invention, it is possible to efficiently produce, by a simple method, an inorganic iodide which is suitably applicable for (i) use as raw materials of pharmaceutical agents, (ii) use in photosensitizing agents of film, or (iii) use in a liquid crystal display.

The invention claimed is:

1. A method for producing an inorganic iodide, comprising the step of:
   a) contacting a saturated hydrogen iodide solution with crude hydrogen iodide gas comprising iodine gas and hydrogen iodide gas, wherein the contacting results in separation of the iodine gas from the hydrogen iodide gas,
   b) collecting the hydrogen iodide gas separated from the iodine gas, the collected hydrogen iodide gas containing iodine molecules by not more than 2 wt % with respect to a total weight, of the hydrogen iodide gas, which is 100 wt %,
   c) reacting the collected hydrogen iodide gas with an inorganic base compound by bringing the hydrogen iodide gas into contact with the inorganic base compound, wherein said reacting results in production of an inorganic iodide.

2. The method according to claim 1, wherein the inorganic base compound is in a form of liquid.

3. The method according to claim 1, wherein the hydrogen iodide gas comprises a hydrogen iodide gas which is generated by bringing a hydrogen gas into contact with a gaseous iodine under a presence of a catalyst.

4. The method according to claim 3, wherein the catalyst is such that at least one type of platinum group elements is dispersed and supported on at least one of oxide and activated charcoal.

5. The method according to claim 1, wherein the inorganic base compound contains at least one of alkali metals and alkali earth metals.

6. The method according to claim 1, wherein the inorganic base compound is ammonia.

* * * * *